US011421960B2

(12) United States Patent
Sun et al.

(10) Patent No.: US 11,421,960 B2
(45) Date of Patent: Aug. 23, 2022

(54) SELF-ADAPTIVE BRIGHTNESS ADJUSTMENT CIRCUIT AND SOLAR INNER RED DOT SIGHT

(71) Applicant: Huanic Corporation, Shaanxi (CN)

(72) Inventors: Jianhua Sun, Shaaxi (CN); Dong Wang, Shaanxi (CN); Yaofeng Zhao, Shaaxi (CN)

(73) Assignee: Huanic Corporation, Xi'an (CN)

( * ) Notice: Subject to any disclaimer, the term of this patent is extended or adjusted under 35 U.S.C. 154(b) by 0 days.

(21) Appl. No.: 17/261,546

(22) PCT Filed: Nov. 22, 2019

(86) PCT No.: PCT/CN2019/120405
§ 371 (c)(1),
(2) Date: Jan. 19, 2021

(87) PCT Pub. No.: WO2020/125323
PCT Pub. Date: Jun. 25, 2020

(65) Prior Publication Data
US 2021/0262759 A1 Aug. 26, 2021

(30) Foreign Application Priority Data
Dec. 20, 2018 (CN) .......................... 201811565422.8

(51) Int. Cl.
*F41G 1/34* (2006.01)
*H02S 40/38* (2014.01)
(Continued)

(52) U.S. Cl.
CPC ............... *F41G 1/345* (2013.01); *F41G 1/16* (2013.01); *F41G 1/30* (2013.01); *F41G 11/001* (2013.01); *H02S 40/38* (2014.12)

(58) Field of Classification Search
CPC ... F41G 1/345; F41G 1/16; F41G 1/30; F41G 11/001; H02S 40/38
(Continued)

(56) References Cited

U.S. PATENT DOCUMENTS 6,373,628 B1 * 4/2002 Gunnarsson ......... G02B 23/105
359/399
2015/0247702 A1 9/2015 Davidson et al.
2021/0028419 A1 1/2021 Sun et al.

FOREIGN PATENT DOCUMENTS

CN 2463779 Y 12/2001
CN 103954173 A 7/2014
(Continued)

OTHER PUBLICATIONS

International Search Report dated Feb. 28, 2020 in connection with International Application PCT/CN2019/120405.
(Continued)

*Primary Examiner* — Samir Abdosh
(74) *Attorney, Agent, or Firm* — Wolf, Greenfield & Sacks, P.C.

(57) ABSTRACT

A solar inner red dot sight includes a body, a power supply and a solar cell arranged on the body, a control circuit board and an LED light-emitting chip arranged on or in the body, a photoelectric sensor arranged on a side of the LED light-emitting chip, wherein the photoelectric sensor is used to collect illuminance signals of a shooting target or surroundings thereof; the control circuit board obtains power supplied to the LED light-emitting chip according to the signals of the solar cell and the illuminance signals of the photoelectric sensor, and compares the power with the solar energy, when the solar energy is less than the power energy, the control circuit board turns on the power supply to power the LED light-emitting chip; or when the solar signal is strong, the LED light emitting chip is powered by the solar cell only.

5 Claims, 5 Drawing Sheets

(51) Int. Cl.
*F41G 1/16* (2006.01)
*F41G 1/30* (2006.01)
*F41G 11/00* (2006.01)

(58) Field of Classification Search
USPC .......................................................... 42/113
See application file for complete search history.

(56) References Cited

FOREIGN PATENT DOCUMENTS

| | | | |
|---|---|---|---|
| CN | 203785548 U | * | 8/2014 |
| CN | 203785548 U | | 8/2014 |
| CN | 106440939 A | * | 2/2017 |
| CN | 207741635 U | * | 8/2018 |
| CN | 108592700 A | | 9/2018 |
| CN | 109405645 A | | 3/2019 |
| EP | 1387142 A1 | | 2/2004 |
| JP | 2014-528051 A | | 10/2014 |
| KR | 101296340 B1 | | 8/2013 |
| WO | WO 2012/027413 A2 | | 3/2012 |
| WO | WO 2013/102868 A1 | | 7/2013 |
| WO | WO-2021222842 A1 | * | 3/2021 |

OTHER PUBLICATIONS

Japanese Decision to Grant dated May 10, 2022, in connection with Japanese Application No. 2021-508061.
Extended European Search Report dated May 12, 2022, in connection with European Application No. EP 19901174.3.

* cited by examiner

SELF-ADAPTIVE BRIGHTNESS ADJUSTMENT CIRCUIT AND SOLAR INNER RED DOT SIGHT

RELATED APPLICATIONS

This Application is a national stage filing under 35 U.S.C. § 371 of International Patent Application Serial No. PCT/CN2019/120405, filed Nov. 22, 2019, which is based upon and claims foreign priority benefits under 35 U.S.C. § 119(a)-(d) or 35 U.S.C. § 365(b) of Chinese Patent Application No. 201811565422.8, filed Dec. 20, 2018. The entire contents of these applications are incorporated herein by reference in their entirety.

TECHNICAL FIELD

The present disclosure relates to a self-adaptive brightness adjustment circuit and a solar inner red dot sight.

BACKGROUND

The inner red dot sight with the LED light module installed on the inner wall of the inner core cavity of the sight is one of the existing inner red dot sights. It has the characteristic of hiding the light emitted by the LED light module. Especially the inner red dot module with solar cell power supply can also use sunlight to power the LED light module, thereby saving battery power, at the same time, the brightness of the LED light can be adjusted adaptively according to the intensity of the received sunlight, without manual adjustment. However, this kind of power supply method that uses the characteristics of solar power generation to adjust the brightness or strength of the LED lights has a very obvious defect, that is, when the ambient light of the sight is inconsistent with the light of the target itself or the light of the environment and has a strong difference, for example, when the sight is indoors and the target is exposed to outdoor sunlight, the intensity of the light spot emitted by the LED light cannot adapt to the brightness required by the target in a strong light environment, which results in a weak brightness of the inner red dot, and further makes the aiming difficult or even almost invalid.

Similarly, when the shooter who is in a bright place shoots at a target in a dark environment, only relying on collecting the aforementioned illuminance of the target or the illuminance around the target to adjust the brightness of the LED will make the shooter's experience worse, and even cause the shooter's discomfort and disgust because of the weakening of the LED brightness.

SUMMARY

To achieve the above objective, the present disclosure provides a solar inner red dot sight, including: a power supply battery and a solar cell arranged on a body, a control circuit board and an LED light emitting chip arranged on the body or in the body, characterized in that, further comprising a photoelectric sensor used to collect an illuminance signal of a shooting target or surroundings of the shooting target.

The power supply battery and the solar cell forming a dual power supply circuit.

The solar cell and the photoelectric sensor forming a dual sensor sampling circuit.

The dual power supply circuit driving the LED light emitting chip through the control circuit board, and the control circuit board controlling the dual power supply circuit to provide suitable power supply to the LED light emitting chip according to the illuminance signal of the dual sensor sampling circuit in different environments, thereby the LED light emitting chip obtaining electric energy adapted to the illuminance, and providing a clear and moderate brightness illuminance to ensure shooting accuracy.

The photoelectric sensor and the LED light emitting chip are installed in one LED base, and the photoelectric sensor is located a side of the LED light emitting chip, and in addition to functions described above, a group of optoelectronic transceivers are formed, and functions of the inner red dot sight are set through the external photoelectric transceivers.

The advantages of the present disclosure are: the structure is simple, the brightness of the LED light can be adjusted adaptively according to the illumination of the target itself and the environment in which it is located, in particular, it can take into account the environment in which the shooter located obtained through the reaction of the solar panel, and comprehensively obtain the working electric energy of the LED to make it work at the best, the output brightness meets the need for clear aiming assistance, without the need to manually adjust the lithium battery power supply, which simplifies the operation and can also save the lithium battery power.

The present disclosure will be described in detail below with reference to the drawings and embodiments.

DETAILED DESCRIPTION

Figure 1:
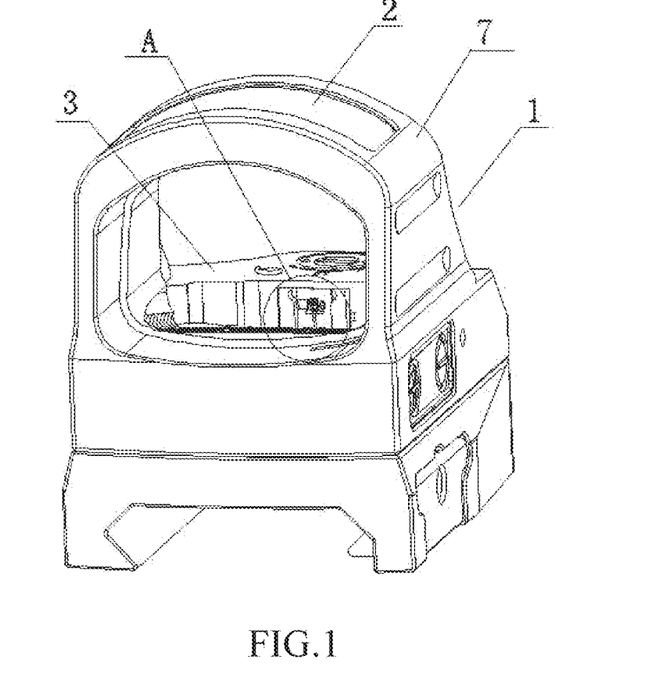
FIG. 1 is a schematic diagram of a solar inner red dot sight.
Figure 2:
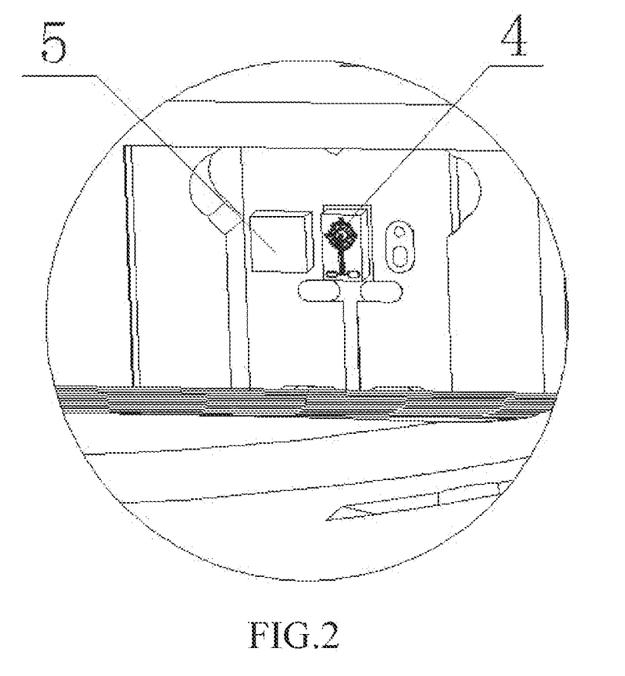
FIG. 2 is an enlarged view of part A in FIG. 1.

FIGS. 1 and 2 show a solar inner red dot sight, including a power supply, a solar cell 2, a control circuit board 200 and an LED light emitting chip 4 arranged on the body 1 or in the body 1, and further including a photoelectric sensor 5 (or called the illuminance sensor to detect the intensity signal of the light) arranged on one side of the LED light emitting chip 4, FIG. 1 shows an open inner red dot sight, including a lens mount 7 mounted on the top front end of the body 1, and an LED light emitting chip 4 is mounted on the rear end portion 3 of the body 1. The photoelectric sensor 5 is used to collect the illuminance signal of the shooting target or the surroundings of the shooting target and the environmental illuminance signal of the inner red dot sight collected by the solar cell 2. The photoelectric sensor 5 and the solar cell 2 form a dual sensor (or may be called dual sensor sampling circuit). The control circuit board 200 obtains the electric energy required to provide the LED light emitting chip 4 according to the illuminance signals of the dual sensor, and compares the electrical energy with the electrical energy generated by the solar energy provided by the solar cell 2, so that when the electric energy of the solar cell is less than the electric energy, the control circuit board 200 controls the battery power supply drive circuit to provide compensatory power supply to the LED light emitting chip 4 and then the LED light emitting chip 4 can obtain enough power to work, that is, the electrical energy provided by the battery to the LED light-emitting chip 4 is the difference between the electrical energy generated by the control circuit board 200 according to the illuminance signals of the dual sensors should be provided to the LED light emitting chip 4 and the electric energy generated by solar energy provided by solar cell 2, thereby ensuring that the LED light emitting chip 4 has enough power to work normally. Or when the solar signal is strong, the LED light emitting chip 4 is powered only by controlling the solar cell power supply drive circuit. Through this circuit structure, it can ensure that the brightness of the LED light emitting chip 4 can clearly illuminate the shooting target, that is, the brightness of the LED light emitting chip 4 is compatible with the light intensity reflected by the shooting target or the ambient light intensity, so as to provide a clear and bright red dot indicator, that is also to say, regardless of the light intensity of the environment where the shooting target is located, the brightness of the inner red dot is always stronger than the light intensity of the shooting target or the environment where the target is located, thereby providing users with bright and conspicuous light point indication to facilitate precise aiming.

When shooting a target in a relatively dark environment, in order to ensure the comfort of the shooter, this embodiment uses the solar cell 2 and the photoelectric sensor as sensors. The illuminance signal of the solar cell 2 and the photoelectric sensor is collected by the control circuit board 200, thereby effectively avoiding the problem that the light emitted by the LED is not coordinated with the target ambient light due to the large or small power supply of the LED caused by only relying on a single illuminance sensor.

Figure 3:
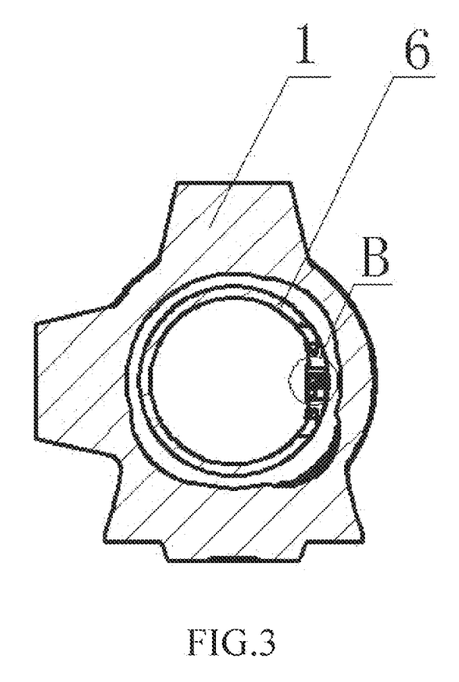
FIG. 3 is a schematic diagram of the inner core structure of another tube-type solar inner red dot sight.
Figure 4:
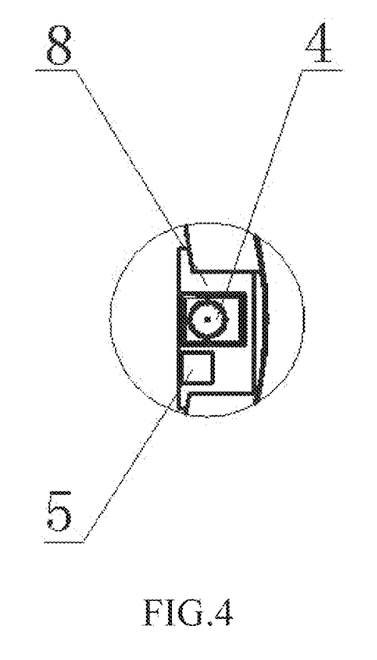
FIG. 4 is an enlarged view of part B in FIG. 3.

FIGS. 3 and 4 show schematic diagrams of the inner core of another tube-type inner red dot sight with auxiliary power supply from solar cells, with the help of the body 1 and the inner core 6, the light interference of the environment where the inner red dot sight is located can be effectively eliminated or reduced, and the reflected light intensity of the shooting target or the light intensity of the environment can be obtained more, that is, the inner red dot sight includes the inner core 6 installed in the main body 1, the photoelectric sensor 5 and the LED light emitting chip 4 are both installed on the inner wall of the inner core 6, specifically, the photoelectric sensor 5 and the LED light emitting chip 4 are installed in the inner core 6 inside the LED base 8. The PD, that is, the photoelectric sensor, is installed near the LED chip on the inner wall of the inner core 6 to detect the intensity of the reflected light of the target object entering the core tube or the intensity of the ambient light near the target, and transmit it to the MCU for comparison with the power supply signal of the solar cell, so as to achieve the same control function. Where, the MCU is Micro controller Unit, which is also called Single Chip Microcomputer.

In this embodiment, the photoelectric sensor and the LED light emitting chip are integrated on a circuit board, and mounted on the inner cavity surface of the inner core 2 of the sight shown in FIG. 3 or the LED chip mount at the rear end portion of the base shown in FIG. 1, in this way, the photoelectric sensor is less affected by the light of the environment in which the sight is located, and more receives the ambient light from the target itself or its surroundings, so as to meet the design goal of the LED lighting that is adaptively adapted to the target.

The inner red dot sight of the present disclosure can overcome the problem that the existing solar inner red dot sight cannot adapt to the light intensity of the target itself or its environment, especially when the target is in a strong light environment, it cannot produce an inner red dot that adapts to the light intensity of the environment in which the target is located, resulting in difficult aiming or even failure. At the same time, the present disclosure takes into account the comfort of the shooter when shooting a target in a darker environment, so that it enables the shooter to obtain the LED brightness that matches the ambient light at the target position, reducing the misjudgment and tedious operation caused by the previous single sensor.

As shown in FIGS. 5, 6, 7, 8, and 9, a self-adaptive brightness adjustment circuit based on the target includes a LED light source (LED light emitting chip), MCU, an illuminance sensor (photoelectric sensor), a solar cell, and a solar cell powered drive circuit 400, a power supply battery 100 and battery powered drive circuit 500. The illuminance sensor transmits the collected illuminance signal of the reflected light of the target or the ambient light around the target to the MCU through the signal amplification circuit 300; the solar cell powered drive circuit 400 is connected to the LED light source; the power supply battery 100 is connected to the LED light source through the MCU and the battery powered drive circuit 500. In addition to generating power, the solar cell also transmits the signal to the MCU, the MCU controls the amount of power provided by the solar cell powered drive circuit 400 to the LED light source by judging the intensity of the solar cell signal; the MCU compares the dual sensor signals to control the dual drive circuits to supply power to the LED light source, thereby always ensuring that the brightness of the LED light source is in a strong state.

In this way, the operation of the solar cell drive circuit and the battery powered drive circuit 500 is controlled by comparing the intensity of the target itself or the surrounding ambient light collected by the photoelectric sensor with the sampling signal of the solar cell in the environment where the sight is located, so as to always ensure that the emitted light of the LED light maintains a high brightness, which is very helpful for assisting aiming.

Figure 5:
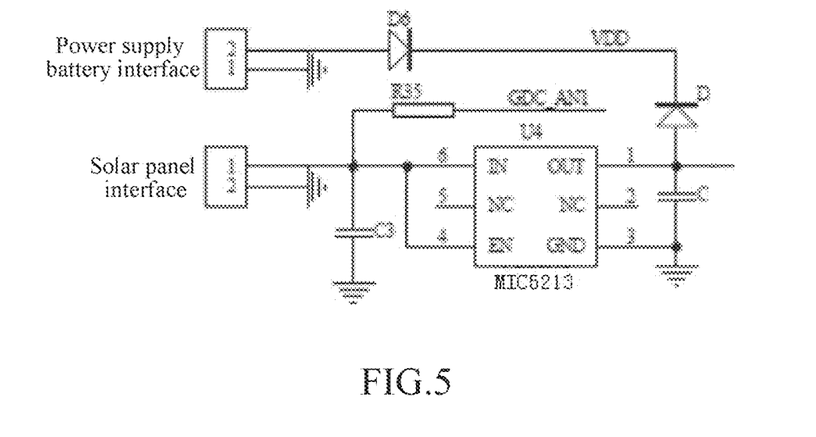
FIG. 5 is a diagram of a solar voltage regulator circuit.
Figure 6:
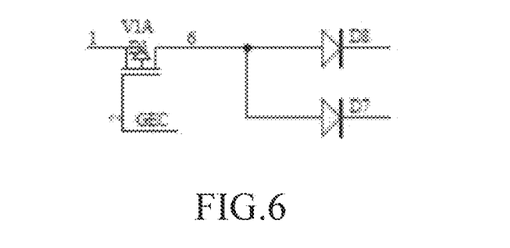
FIG. 6 is a diagram of a circuit of a solar compensation switch.
Figure 7:
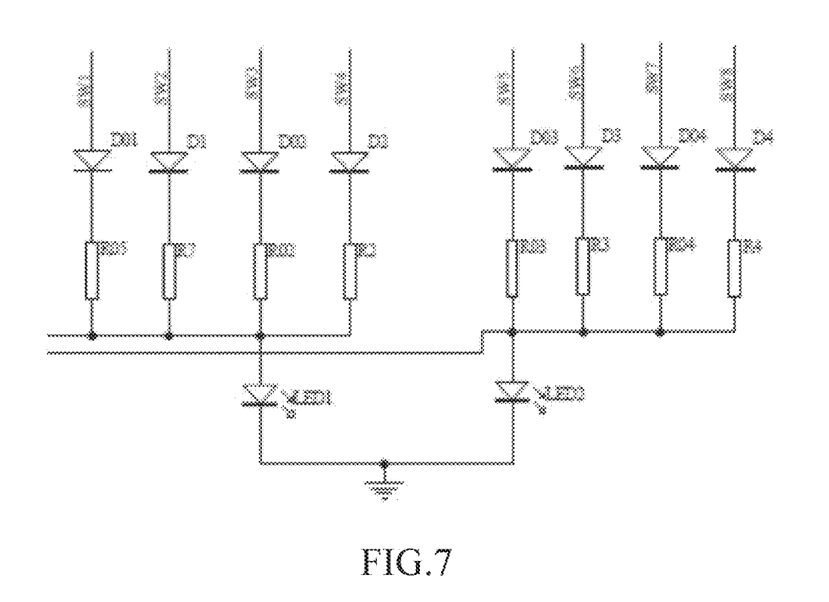
FIG. 7 is a diagram of a gear control circuit.
Figure 8:
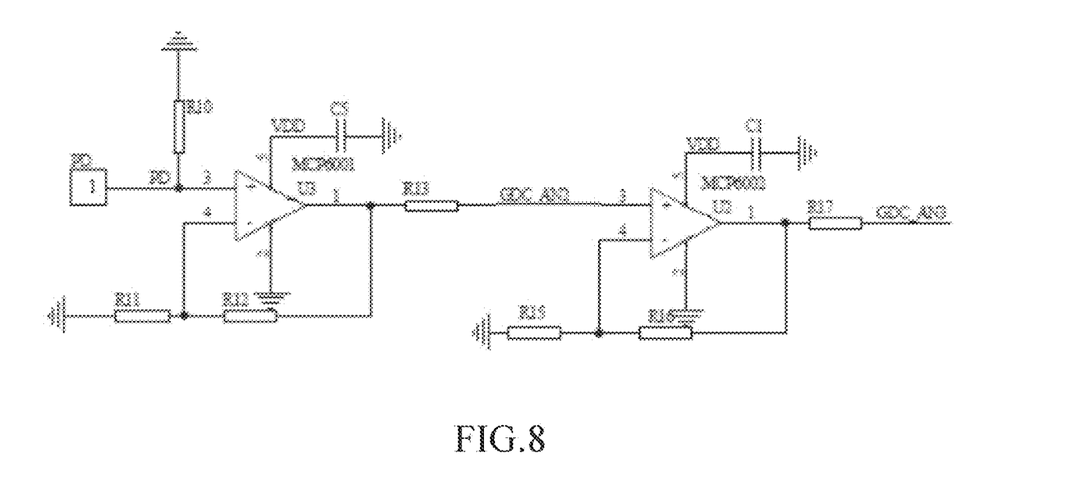
FIG. 8 is a diagram of a signal amplifying circuit.
Figure 9:
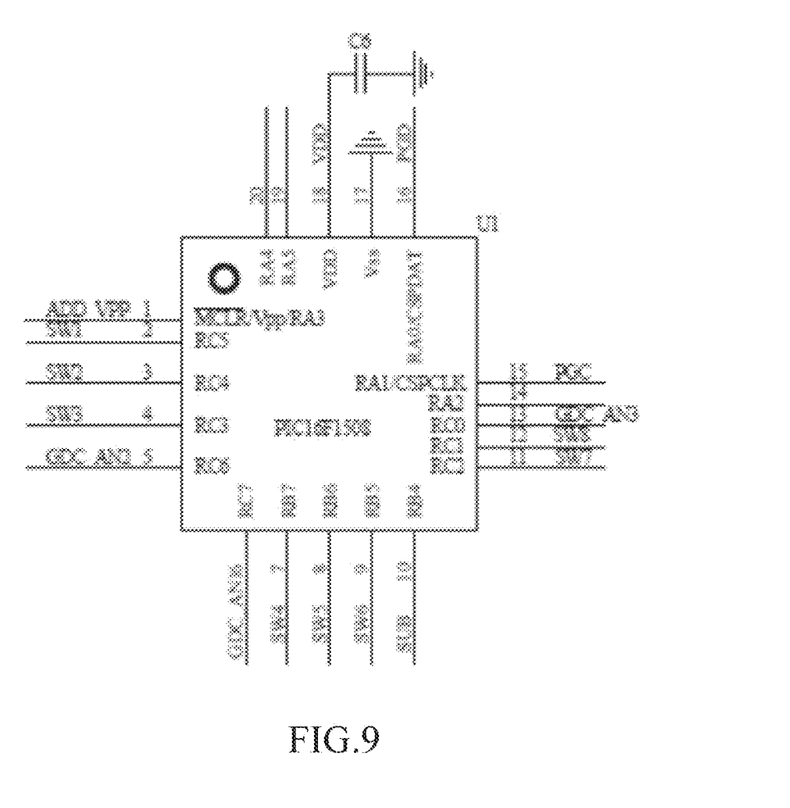
FIG. 9 is a diagram of a MCU and its surrounding circuits.

FIG. 5 shows the solar powered driving circuit, which transmits sampling signals to the MCU of PIC16F1508 and its peripheral circuits shown in FIG. 9 through GDC_AN1. The signal of the photoelectric sensor is filtered and amplified by the signal amplifying circuit shown in FIG. 8 and then transmitted to the MUC, after the MCU compares the signal with the signal of the solar cell, it provides compensatory power supply for the LED light source through the solar cell drive circuit and the power supply battery 100 drive circuit shown in FIG. 6. FIG. 7 shows the battery powered drive circuit 500 and button control gear circuit.

Figure 10:
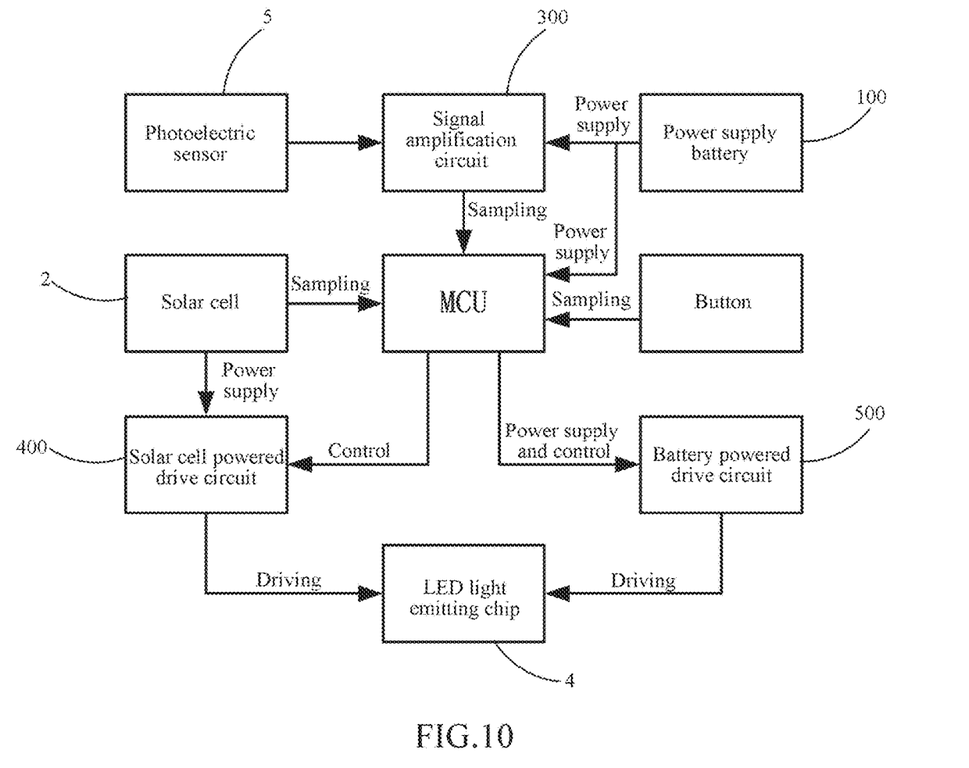
FIG. 10 is a schematic diagram of the principle of an self-adaptive brightness adjustment circuit.

With reference to FIG. 10, it shows an self-adaptive brightness adjustment circuit based on the target and ambient light, including LED light emitting chip 4, MCU, buttons, solar cell 2, photoelectric sensor 5, solar cell powered drive circuit 400, power supply battery 100 and battery powered drive circuit 500; the photoelectric sensor 5 transmits the collected illuminance signal of the reflected light of the target or the ambient light around the target to the MCU through the signal amplification circuit 300; the solar cell 2 is connected to the LED light emitting chip via a solar cell drive circuit; the power supply battery 100 is connected to the LED light emitting chip via the MCU and then via the battery powered drive circuit 500.

In this circuit, the solar cell and the photoelectric sensor form a dual sensor; the solar cell 2 and the power supply battery 100 form a dual power supply; the solar cell drive circuit and the battery powered drive circuit 500 form a dual drive circuit; the following functions are realized through MCU control.

1). When the dual sensor provides strong signals to the MCU, the MCU mainly controls the solar cell drive circuit to take power from the solar cell 2 to provide the LED light emitting chip 4 with the power required to emit light, so as to meet the cursor illumination brightness required by the shooting target environment.

2). When the dual sensors provide weak signals to the MCU, the MCU mainly controls the battery powered drive circuit 500 to take power from the power supply battery 100 to provide the LED light emitting chip 4 with the power required to emit light, so as to meet the cursor illumination brightness required by the shooting target environment.

3). When the signal of the photoelectric sensor 4 is stronger than the signal of the solar cell 2, the MCU takes power from the dual power supply by controlling the dual drive circuit to provide the power required for the LED light emitting chip 4 to emit light, and when the power required by the LED light emitting chip 4 is greater than the power supplied by the solar cell, the MCU supplements the power from the power supply battery 100 through the battery powered drive circuit 500 to obtain a clear and moderate brightness, thereby meeting the cursor illumination brightness required by the shooting target environment.

4). When the signal of the photoelectric sensor 4 is weaker than the signal of the solar cell 2, the MCU takes power from the dual power supply by controlling the dual drive circuit to provide the power required for the LED light-emitting chip 4 to emit light, in addition, according to the difference of the dual sensor signals, the electric energy required for the LED light-emitting chip 4 to emit light is reasonably matched to obtain a clear and moderate brightness illuminance, thereby meeting the cursor illumination brightness required by the shooting target environment.

In summary, it is not difficult to see that the solar inner red dot sight provided by this embodiment, in order to make the shooting accuracy closer to the target itself or the environment where the target is located, the LED is provided with adaptive power supply based on the ambient illuminance, and the power supply battery 100 and the solar cell 2 form a dual power supply circuit; the solar cell 2 and the photoelectric sensor 5 form a dual sensor sampling circuit; Where, the dual power supply circuit drives the LED light emitting chip 4 through the control circuit board 200, and the control circuit board 200 controls the dual power supply circuit to provide suitable power supply to the LED light emitting chip 4 according to the illuminance signals of the dual sensor sampling circuit in different environments, as a result, the LED light emitting chip 4 obtains electric energy adapted to the illuminance, thereby providing a clear and moderate brightness illuminance to ensure shooting accuracy.

Figure 11:
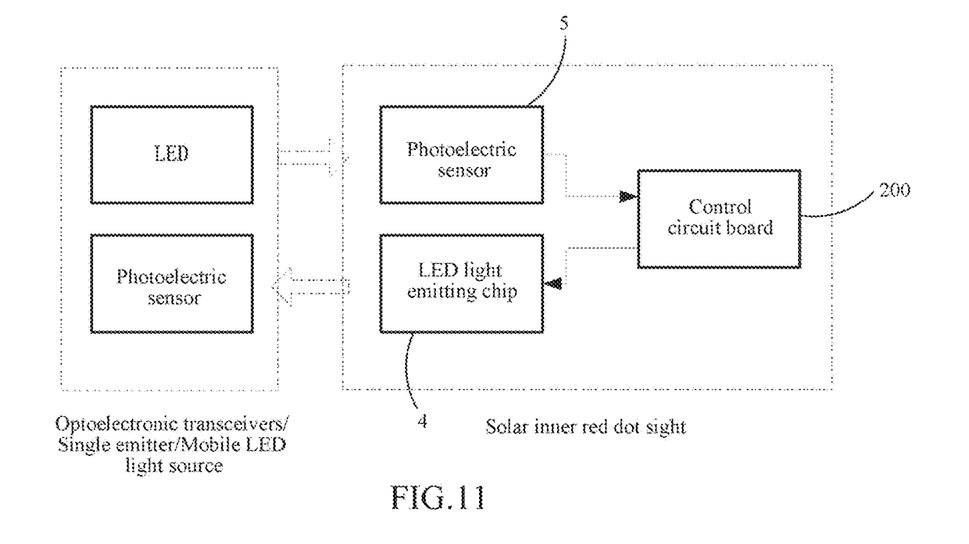
FIG. 11 is a schematic diagram of the control principle in which the illuminance sensor collects signals from external lighting equipment to the control circuit board to implement circuit system function settings.

In addition, the control circuit board 200 provided in this embodiment can also be provided with the illumination signal collected by the photoelectric sensor 5, such as the external LED illumination signal shown in FIG. 11, the control circuit board 200 controls the LED light emitting chip 4 to emit light signals according to the light signal of the external LED collected by the photoelectric sensor 5, so as to realize the transmission and control of communication signals of different setting methods or purposes, for example, the timing function of the sight to shut down is set according to the acquired external light signal, and also realize the coefficient of adjusting the brightness parameter of the inner red dot LED (i.e. LED light emitting chip 4) according to the illumination signal collected by the photoelectric sensor 5, such as the collected light of the photoelectric transceiver or the light of the single light emitter (such as lighting) or the light of the mobile phone light source, namely the LED light. Different customers have different requirements for the brightness of the inner red dot LED under the same ambient brightness, so as to meet the actual needs of some customers who need to be brighter, and some customers who need to be weaker.

The above two different communication methods are as follows: aim the flash of the mobile phone at the sensor, namely the photoelectric sensor 5, on the inner side of the rear end of the inner shell, use the APP software on the mobile phone to adjust the flashing frequency of the flash. For example, the flash flashes for 30 HZ 5 s, and then flashes for 15 HZ 5 s, which means to increase the automatic shutdown time by one level, and the automatic shutdown time is changed from the previous 3 hours to 4 hours; at this time, the inner red dot LED flashes quickly 4 times every 1 s; the flash flashes for 30 HZ 5 s, and then flashes for 10 HZ 5 s, which means to increase the automatic shutdown time by one level, and the automatic shutdown time is changed from the previous 3 hours to 1 hour, at this time, the inner red dot LED flashes quickly 2 times every 1 s. The realization of these functions mainly depends on the realization of software programs. And when it is used at night, the photoelectric sensor 5 can also monitor the opposite person to use infrared light to illuminate one's own side, so as to realize the early warning function.

What is claimed is:

1. A solar inner red dot sight, comprising: a power supply battery and a solar cell arranged on a body, a control circuit board and an LED light emitting chip arranged on the body or in the body, and further comprising a photoelectric sensor used to collect an illuminance signal of a shooting target or surroundings of the shooting target;

the power supply battery and the solar cell forming a dual power supply circuit;

the solar cell and the photoelectric sensor forming a dual sensor sampling circuit;

the dual power supply circuit driving the LED light emitting chip through the control circuit board, and the control circuit board controlling the dual power supply circuit to provide suitable power supply to the LED light emitting chip according to the illuminance signal of the dual sensor sampling circuit in different environments, thereby the LED light emitting chip obtaining electric energy adapted to the illuminance, and providing a clear and moderate brightness illuminance to ensure shooting accuracy;

the photoelectric sensor and the LED light emitting chip are installed in one LED base, and the photoelectric sensor is located at a side of the LED light emitting chip, and in addition to functions described above, the photoelectric sensor and the LED light emitting chip are also configured to form a group of optoelectronic transceivers, the control circuit board controls the LED light emitting chip to emit light signals according to external illumination signal collected by the photoelectric sensor, and functions of the inner red dot sight are set through external photoelectric transceivers.

2. The solar inner red dot sight according to claim 1, further comprising:
an inner core installed in the main body, the photoelectric sensor and the LED light emitting chip are both installed on the inner wall of the inner core.

3. The solar inner red dot sight according to claim 1, further comprising:
a lens mount mounted on a top front end of the body, the LED light emitting chip is mounted on a rear end of the body, the photoelectric sensor is mounted on an inner wall of the lens mount.

4. A self-adaptive brightness adjustment circuit based on a target and ambient light, comprising:
a LED light emitting chip, MCU, a solar cell, a photoelectric sensor, a signal amplification circuit, a solar cell powered drive circuit, a power supply battery and a battery powered drive circuit;
the photoelectric sensor is configured to transmit a collected illuminance signal of a reflected light of the target or a ambient light around the target to the MCU through the signal amplification circuit;
the solar cell is configured to collect the ambient light around a solar inner red dot sight, generate electricity and provide the electricity to the solar cell powered drive circuit, at the same time, transmit a ambient illuminance signal around the solar inner red dot sight to the MCU;
the solar cell powered drive circuit is connected to a LED light source and is controlled by the MCU;
the power supply battery is connected to the LED light emitting chip (4) via the MCU and then via the battery powered drive circuit;
the solar cell powered drive circuit and the battery powered drive circuit forming a dual drive drive circuit;
the power supply battery and the solar cell forming a dual power supply circuit;
the solar cell and the photoelectric sensor forming a dual sensor sampling circuit;
the dual power supply circuit is configured to provide power for the LED light emitting chip, and the MCU is configured to control the dual power supply circuit to supply electric energy required for the LED light emitting chip to emit light according to illuminance signals of the dual sensor sampling circuit in different environments, thereby the LED light emitting chip obtaining the electric energy to provide a clear and moderate brightness illuminance to ensure shooting accuracy.

5. The self-adaptive brightness adjustment circuit based on target and ambient light according to claim 4, wherein:
when the dual sensor sampling circuit provides strong signals to the MCU, the MCU mainly controls the solar cell drive circuit to take power from the solar cell to provide the LED light emitting chip with the power required to emit light, so as to meet a cursor illumination brightness required by a shooting target environment;
when the dual sensor sampling circuit provides weak signals to the MCU (i.e. the term sampling circuit) the MCU mainly controls the battery powered drive circuit to take power from the power supply battery to provide the LED light emitting chip with the power required to emit light, so as to meet the cursor illumination brightness required by the shooting target environment;
when a signal sampling circuit of the photoelectric sensor is stronger than a signal of the solar cell, the MCU takes power from the dual power supply sampling circuit by controlling the dual drive circuit to provide the power required for the LED light emitting chip to emit light, and when the power required by the LED light emitting chip is greater than the power supplied by the solar cell, the MCU supplements the power from the power supply battery through the battery powered drive circuit to obtain a clear and moderate brightness, thereby meeting the cursor illumination brightness required by the shooting target environment;
when the signal of the photoelectric sensor is weaker than the signal of the solar cell, the MCU takes power from the dual power supply by controlling the dual drive circuit to provide the power required for the LED light emitting chip to emit light, in addition, according to a difference of the dual sensor signals, the electric energy required for the LED light emitting chip to emit light is reasonably matched to obtain a clear and moderate brightness illuminance, thereby meeting the cursor illumination brightness required by the shooting target environment.

* * * * *